(12) United States Patent
Bauer

(10) Patent No.: US 7,221,548 B2
(45) Date of Patent: May 22, 2007

(54) RESIDUAL-CURRENT CIRCUIT BREAKER AND A METHOD FOR TESTING THE RELIABILITY PERFORMANCE OF A RESIDUAL-CURRENT CIRCUIT BREAKER

(75) Inventor: Bernhard Bauer, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 99 days.

(21) Appl. No.: 10/130,751

(22) PCT Filed: Apr. 24, 2001

(86) PCT No.: PCT/EP01/04618

§ 371 (c)(1),
(2), (4) Date: May 23, 2002

(87) PCT Pub. No.: WO01/82441

PCT Pub. Date: Nov. 1, 2001

(65) Prior Publication Data

US 2002/0180444 A1    Dec. 5, 2002

(30) Foreign Application Priority Data

Apr. 25, 2000  (EP) .................................. 00108783

(51) Int. Cl.
*H02H 3/16* (2006.01)
(52) U.S. Cl. .......................................... 361/42; 361/44
(58) Field of Classification Search ............ 361/42–50, 361/56, 93, 93.6, 102; 324/424, 537, 533
See application file for complete search history.

(56) References Cited

U.S. PATENT DOCUMENTS

| | | | | |
|---|---|---|---|---|
| 2,481,198 A | * | 9/1949 | Caldwell | 324/726 |
| 3,978,400 A | * | 8/1976 | Pettit | 324/509 |
| 4,439,724 A | * | 3/1984 | Morong, III | 324/726 |
| 5,652,511 A | * | 7/1997 | Pearse et al. | 324/240 |
| 5,978,191 A | * | 11/1999 | Bonniau et al. | 361/45 |
| 6,081,123 A | * | 6/2000 | Kasbarian et al. | 324/521 |
| 6,094,013 A | * | 7/2000 | Goller et al. | 315/282 |
| 6,307,725 B1 | * | 10/2001 | Solleder et al. | 361/93.6 |
| 6,381,113 B1 | * | 4/2002 | Legatti | 361/46 |

FOREIGN PATENT DOCUMENTS

| | | |
|---|---|---|
| DE | 28 45 993 A1 | 5/1979 |
| DE | 198 18 054 A1 | 10/1999 |

OTHER PUBLICATIONS

H. Rosch, "Fehlerstrom-Schutzschalter Zum Schutz Gegen Gefahrliche Korperstrome", Elektrotechnische Zeitschrift, ETZ, DE, VDE Verlag BMBH. Berlin, vol. 110 (1989), Issue 12, pp. 580-584.

* cited by examiner

Primary Examiner—Brian Sircus
Assistant Examiner—Danny Nguyen
(74) Attorney, Agent, or Firm—Harness, Dickey & Pierce, P.L.C.

(57) ABSTRACT

A test circuit is provided, which is independent of a power supply and which enables a circuit breaker to be tested in a reliable manner. The test circuit includes a test coil which is devoid of electric potential and is wound around a totalizing current transformer. The test coil is preferably short circuited using a test switch and a connectable load. This simulates the occurrence of a residual current. The selection of an appropriate connectable load allows the sensitivity of the current circuit breaker to be tested in an advantageous manner.

23 Claims, 3 Drawing Sheets

PRIOR ART

RESIDUAL-CURRENT CIRCUIT BREAKER AND A METHOD FOR TESTING THE RELIABILITY PERFORMANCE OF A RESIDUAL-CURRENT CIRCUIT BREAKER

This application is the national phase under 35 U.S.C. § 371 of PCT International Application No. PCT/EP01/04618 which has an International filing date of Apr. 24, 2001, which designated the United States of America, the entire contents of which are hereby incorporated by reference.

FIELD OF THE INVENTION

The invention generally relates to a fault-current circuit breaker. In particular, it relates to a differential-current circuit breaker, having a core-balance current transformer and a control winding wound around it. The invention also generally relates to a method for checking the reliability of such a fault-current circuit breaker.

BACKGROUND OF THE INVENTION

Fault-current circuit breaker are used in electrical systems, in order to protect personnel against dangerous body currents. When a fault current occurs, the circuit breaker disconnects the conductors of a conductor network. The circuit breaker is used as an autonomous unit, or else as an additional module for a switching device. Such an additional module is referred to as a circuit breaker accessory.

With regard to circuit breakers, a distinction is drawn between main voltage independent, so-called FI switches (fault-current circuit breakers) and main-voltage-dependent DI circuit breakers (differential-current circuit breakers). Both switch types have a core-balance current transformer, through which the conductors of a conductor network are passed. A control winding is wound around the core-balance current transformer and is connected to an evaluation unit, via which a release is actuated. When an unacceptable fault current occurs in the conductor network, this is detected by the core-balance current transformer with the associated evaluation unit, and the release disconnects the conductors of the conductor network via a switching mechanism. The fault current at which the circuit breaker responds is referred to as the tripping fault current. The ratio of the tripping fault current to the so-called rated fault current is fixed and is defined by Standards for the various fault current types. The rated fault current is a measure of the protection class for which the respective circuit breaker is designed.

As a rule, FI/DI circuit breakers have a test device, by which the reliability of the circuit breaker can be checked. Such a test device normally connects two primary conductors to one another via a series circuit comprising a test resistor and a test winding and via a test contact (pushbutton) which can be operated, forming a test circuit. A fault current is thus produced when the test contact is closed, and this is detected by the core-balance current transformer together with the associated evaluation unit. A test device such as this can be found, for example, in the article "Fehlerstrom-Schutzschalter zum Schutz gegen gefährliche Körperströme", [Fault current circuit breaker for protection against dangerous body currents] etz, Volume 110 (1989), Issue 12, pages 580–584.

When two conductors are short-circuited for test purposes, there is a problem in that, in some circumstances, a test current will flow permanently via the test circuit for as long as the test contact is operated. This problem occurs when connection of the test circuit to the conductors of the conductor network is made on the mains voltage supply side, that is to say upstream of the circuit breaker switching mechanism, so that current continues to flow in the test circuit even after the conductors have been disconnected by the circuit breaker during the test. Thus, in conventional test devices, an auxiliary switch which is coupled to the switching mechanism of the circuit breaker is often connected in the test circuit, and interrupts the test circuit when the circuit breaker trips, in order to ensure that the current flow is reliably interrupted. However, the arrangement of an auxiliary switch on the one hand requires additional measures and on the other hand is not always possible, for example in the case of FI/DI accessories, since there is no switching mechanism for space reasons. If it is impossible to arrange any auxiliary switches, the test circuit must therefore be designed, for example, for permanently flowing test current. The design for permanent excitation is extremely complex, in particular when the circuit breaker is designed for high-rated fault currents.

SUMMARY OF THE INVENTION

An embodiment of the invention is based on an object of specifying a fault-current circuit breaker and/or a method for checking its reliability which allows the circuit breaker to be configured in a simple and functionally reliable manner.

An object with regard to the circuit breaker can be achieved according to an embodiment of the invention by a fault-current circuit breaker, in particular a differential-current circuit breaker, with a core-balance current transformer and with a control winding wound around it. A main-voltage-independent test circuit is preferably provided, with a floating test winding wound around the core-balance current transformer.

In contrast to the known test device, in which an actual fault current is produced by short-circuiting two conductors of the conductor network, an embodiment of the invention can be based on the idea of just simulating a fault current. This avoids the power loss problems associated with a test current flowing for an undefined time. The critical element for simulation of a fault current is the floating test winding, that is to say a coil which is wound around the core-balance current transformer and has no connection for the conductors of the conductor network.

The simulation is based on the principle that the magnetization of the core-balance current transformer is varied by the induction principle as a function of the short-circuit resistance of the test winding. This effect also occurs in the case of a fault current, in this case, as the magnetic fields of the conductors which are passed through the core-balance current transformer no longer cancel one another out. The change to the magnetization of the core-balance current transformer is—as is normal for all-current-sensitive DI circuit breakers—detected by the control winding, which is stimulated by an AC voltage, and by the associated evaluation unit. The evaluation process is in this case carried out essentially on the basis of the permeability, which can be measured or determined via the control winding, of the core-balance current transformer, and is dependent on the change in magnetization of the core-balance current transformer.

In one preferred embodiment, the test circuit has a test switch via which the test winding can be short-circuited. This allows the test circuit to be designed with particularly simple circuitry. The expression test switch also means, in particular, a test button.

The test circuit is in this case preferably designed without a separate voltage supply. The test is thus carried out in a floating manner, in the sense that there is no specific voltage source. In fact, it is sufficient to use for the test the voltage which is induced in the test winding by the alternate magnetization of the core-balance current transformer by the control winding.

In one particularly expedient refinement, the test circuit has a burden which can be connected and which is used to influence the permeability which can be measured via the control winding. The choice of the burden in this case advantageously makes it possible to select the permeability which can be measured, thus simulating a specific fault-current level. The arrangement of the burden thus makes it possible to check the sensitivity of the circuit breaker.

The burden is in this case preferably formed by a resistor connected in series with the test switch. If the test circuit is in the form of a short-circuiting circuit, the short-circuit is thus produced via the resistor, which is then arranged in parallel with the test windings.

In one particularly expedient refinement, the burden which can be connected is designed such that, when the test contact is closed a tripping criterion which is predetermined for the circuit breaker is satisfied, or is more than satisfied by a defined amount.

As already mentioned, the burden offers the capability to check the sensitivity of the circuit breaker. If the burden which can be connected is designed such that the tripping criterion which is predetermined for the circuit breaker by Standards is satisfied exactly, it is possible to identify rises in the tripping fault current above the permissible limit value. If the burden is chosen such that the tripping criterion is more than satisfied by a specific amount, it is possible to ensure correct tripping even in the event of poor component tolerances. The tripping criterion would be exceeded by several times in the case of a pure short-circuit winding with a resistance of zero ohms. A test such as this thus relates to a pure functional test of mechanical disconnection of the conductors. The choice of the burden for determining the tripping criterion provided for the circuit breaker in this case depends on the design of the circuit breaker, for example, on the number of windings for the control winding.

With the previous method of short-circuiting two conductors, it was impossible to check the sensitivity, or this could be carried out only to a highly restricted extent, since the rated voltage range is normally wide. This is because, with a conventional test device, insensitivity of the circuit breaker remains undetected up to a certain level. This is because there is a risk of the circuit breaker not tripping at the specified tripping fault current, but only at a multiple of it, as a result of a functional defect. A functional check based on the conventional method would not detect this functional defect, since the tripping fault current would be considerably exceeded by short-circuiting of the conductors. The test method provided by the floating test winding thus allows considerably better results to be obtained with respect to the serviceability of the circuit breaker, than a conventional test device. In particular, there is no risk of a functional defect remaining undetected and, in the worst case, injuring someone if a fault current were to occur.

In one advantageous embodiment, the burden which can be connected is variable, in particular in order to make it possible to check different sensitivities for circuit breakers whose rated fault current is adjustable. The variability of the burden is achieved, for example, by using a variable potentiometer in the test circuit, or else by using different resistors, for example in conjunction with a multi-stage rotary switch in the test circuit.

According to one particularly expedient refinement, the test circuit has a continuously acting burden, which influences the permeability which can be measured via the control winding.

In conventional circuit breakers, such a permanent burden is often arranged in parallel with the control/or secondary winding, in order to define the tripping response of the circuit breaker. However, this has the disadvantage that a current flows via the burden, which is arranged in parallel to the control winding, and this makes it harder to evaluate the voltage drop across the measurement resistor, which is connected in series with the control winding, as a measure of the measured permeability. With regard to the tripping response, the arrangement of such a permanently acting burden in the test circuit has the same effect as the arrangement in parallel to the control winding, but offers the major advantage that it considerably simplifies the evaluation of the voltage drop across the measurement resistor, which is connected in series with the control winding.

The permanently acting burden is preferably available, so that it is possible to set the tripping fault current and/or the rated fault current. In conjunction with the capability to check different tripping fault currents by means of the variable burden which can be connected, it is thus possible to ensure correct tripping even with poor component tolerances.

The test winding is preferably wound symmetrically around the core-balance current transformer. The symmetrical or uniform winding around the core-balance current transformer in this case ensures that the resultant inductive effect of the inhomogeneous magnetic fields caused by the load currents is cancelled out overall, and that no disturbance voltages are thus induced in the winding. This is particularly necessary when there is a permanently acting burden in the test circuit since this results in the core-balance current transformer being burdened independently of the field distribution. The uniform winding results in non-uniform field distributions in the transformer core, for example caused by the dipole field of the load current, being averaged out over the circumference of the core-balance current transformer.

In one expedient refinement, the test circuit has an additional switch or push button in order to trip the circuit breaker remotely, via which the test winding can be short-circuited.

In particular, the floating configuration of the test circuit is advantageous with regard to the safety requirements for such remote tripping. At the same time, the test winding is expediently sufficiently well isolated from the control winding, which is electrically connected to the conductor network, in order to satisfy the safety requirements, which demand safe conductive isolation between a remote tripping circuit and the conductor network.

In one preferred alternative, a further winding is provided around the core-balance current transformer, in addition to the test winding, for remote tripping. This further winding can preferably likewise be short-circuited. If the circuit for remote tripping has no permanently acting burden, a small number of turns in the further winding are sufficient to ensure operation of the remote tripping. In this case, the winding need not be designed to be symmetrical. This has the advantage that it simplifies the isolation of the control winding.

According to one embodiment of the invention, the reliability of a fault-current circuit breaker can be simulated by a test circuit having a test winding wound around the core-balance current transformer.

The advantages and preferred embodiments mentioned with regard to the circuit breaker can be transferred in the same sense to the method. Particularly expedient refinements of the method are specified in the dependent claims.

BRIEF DESCRIPTION OF THE DRAWINGS

Exemplary embodiments of the invention will be explained in more detail in the following text with reference to the drawings in which, in each case illustrated schematically.

DETAILED DESCRIPTION OF THE PREFERRED EMBODIMENTS

Figure 1:
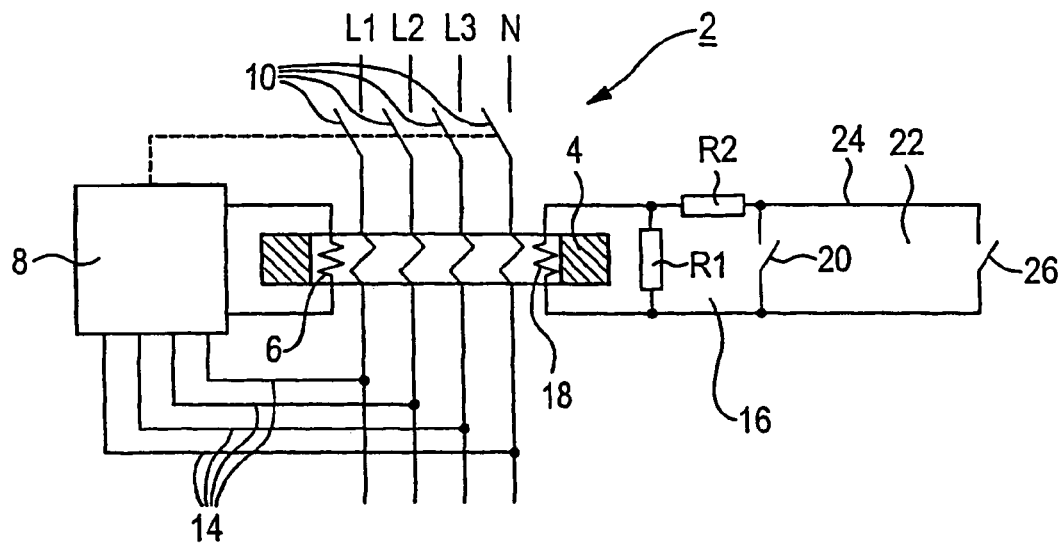
FIG. 1 shows a circuit diagram of a circuit breaker with a test circuit.

As shown in FIG. 1, a fault-current circuit breaker 2 has a core-balance current transformer 4, a control winding 6 wound around it, and a functional unit 8. The latter not only has actuation and evaluation electronics for the control winding 6, but also a tripping mechanism. The conductors L1, L2, L3 and the neutral conductor N of a conductor network are passed through the core-balance current transformer 4. Each conductor L1–L3, N has an associated interrupter switch 10, via which the conductors L1–L3, N are disconnected by means of a switching mechanism 12, which is represented by dashed lines, when an unacceptable fault current occurs.

Supply lines 14 lead from the individual conductors L1–L3, N to the functional unit 8, in order to provide a power supply for the electronics integrated in it. The circuit breaker 2 as shown in FIG. 1 is thus, by definition, in the form of a main-dependent DI circuit breaker.

In addition to the already described elements, which every DI circuit breaker 2 has, the circuit breaker as shown in FIG. 1 has, as an essential new feature, a test circuit 16 with a test winding 18 wound around the core-balance current transformer 4. A permanently acting burden R1 in the form of a resistor is provided in parallel with the test winding 18. The test circuit 16 has a test switch 20, via which the test winding 18 can be short-circuited via a further burden R2 which can be connected. The latter is likewise in the form of a resistor, which is arranged in series with the test switch 20. In the exemplary embodiment shown in FIG. 1, the test winding 18 is at the same time part of a remote tripping circuit 22, which is connected via a remote tripping line 24 to the test circuit 16 and has a switch 26 which is arranged in parallel with the test switch 20.

For safety reasons, and in order to ensure that the circuit breaker is resistant to surge currents, a voltage-limiting element may be provided in parallel with the control winding and/or in parallel with the test winding.

Figure 2:
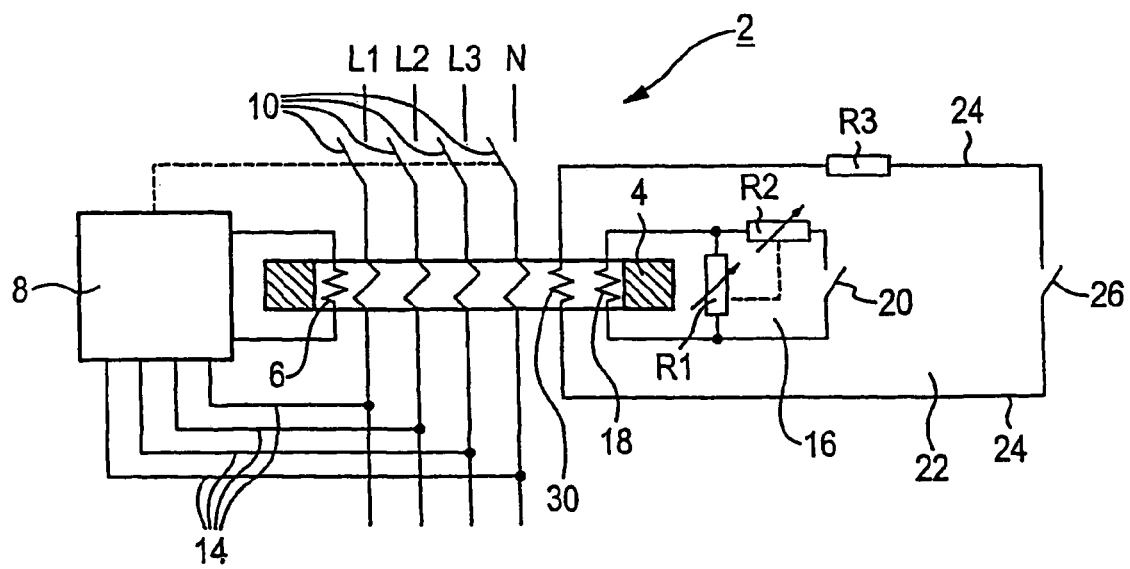
FIG. 2 shows a circuit diagram of a circuit breaker with a modified test circuit and a separate remote tripping circuit.

The exemplary embodiment of a circuit breaker 2 shown in FIG. 2 differs from that shown in FIG. 1 in that the remote tripping circuit 22 is in the form of a separate remote tripping circuit 22 with its own winding 30, and in that the permanently acting burden R1 and the burden R2 which can be connected are configured as variable resistors, in the form of a double potentiometer. The remote tripping circuit 22 can in this case be short-circuited via the switch 26 and via a resistor which acts as a burden R3, in order to cause the circuit breaker R2 to trip.

Figure 3:
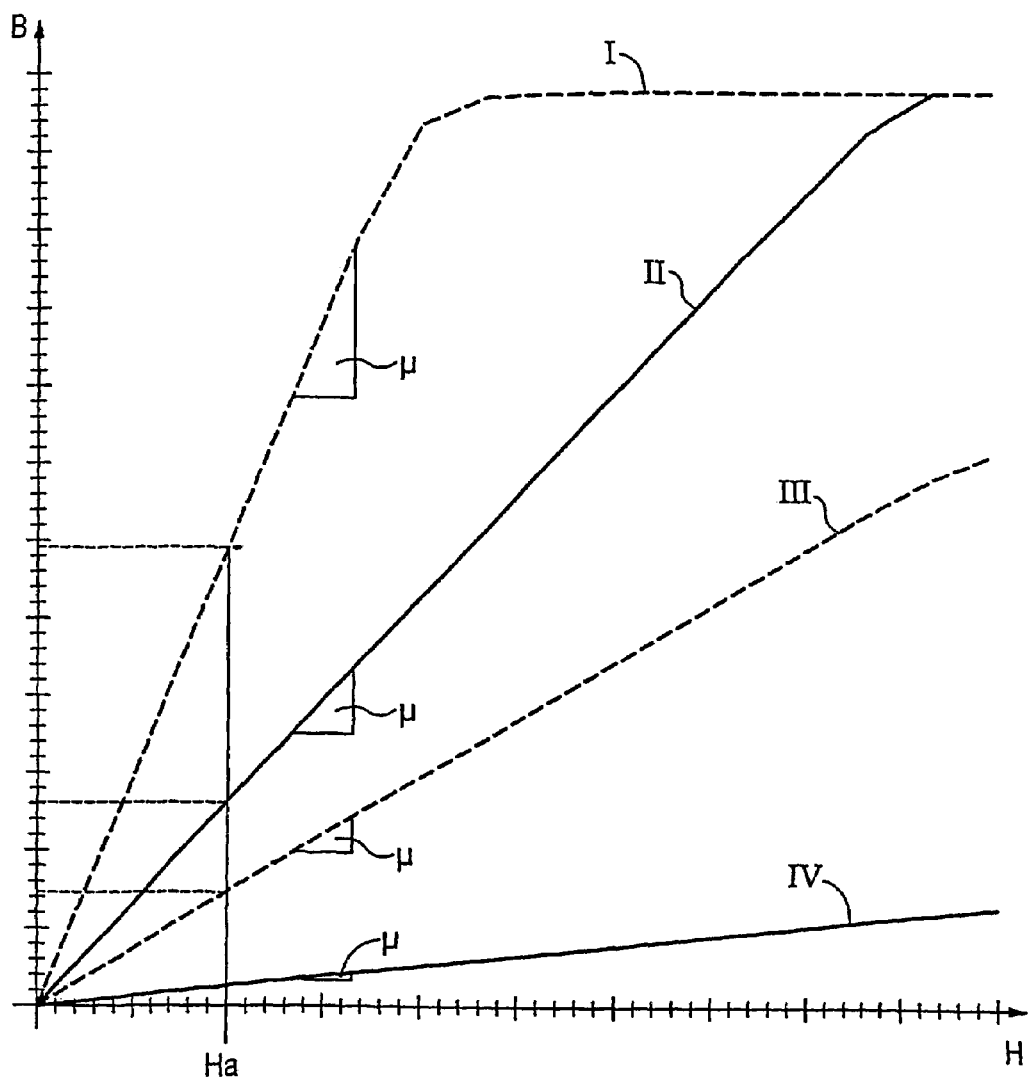
FIG. 3 shows a B-H diagram with different magnetization curves.

The method of operation of the test circuit 16 for checking the reliability of the circuit breaker 2 will be explained in conjunction with FIG. 3 in the following text. FIG. 3 shows a B-H diagram, illustrating a number of magnetization curves I–IV. The magnetic induction B is plotted on the ordinate, against the magnetic field strength H on the abscissa. The individual magnetization curves I–IV have different gradients, with the magnetization curve I bending considerably into a saturation region above a specific magnetic field strength H. The gradient of the individual magnetization curves I–IV corresponds to the permeability μ, as detected by the control winding 6, of the core-balance current transformer 4. The permeability μ measured by the control winding 6 is governed by the actual permeability of the core-balance current transformer 4 and by superimposed effects. One superimposed effect, by way of example, is the occurrence of a fault current in the conductor network, or else a burden. Both effects cause a change to the profile of the magnetization curve and are detected by the control winding with the associated evaluation unit. The permeability μ, that is to say the gradient of the magnetization curve, is generally set by the permanent burden R1. In this case, the gradient of the magnetization curve becomes ever flatter, as the resistance of the burden R1 is decreased. The tripping response of the circuit breaker 2 is also governed by the permanent burden R1.

An AC voltage is applied to the control winding 6, so that the core-balance current transformer 4 is magnetized alternately. The magnetization curve is in this case evaluated at an operating point Ha for a defined magnetic field strength H. This makes use of the fact that the coil resistance of the control winding 6 is high when the permeability μ is high, and is correspondingly reduced when the permeability is less. The voltage drop across the control winding 6 is evaluated via a measurement resistor 28 (in this context, see FIG. 4 and FIG. 5).

The test winding 18 is terminated via the permanently acting burden R1. The alternate magnetization of the core-balance current transformer 4 via the control winding 6 results in a voltage being induced in the test winding 18, so that a current flows in the test circuit 16 which results in the test winding 16 producing a magnetic field which counteracts the magnetization of the core-balance current transformer 4 caused by the control winding 6. The permeability μ measured by the control winding 6 is thus less than the actual permeability of the core-balance current transformer 4.

When the test switch 20 is operated, the further burden R2 is connected, so that the measurable permeability μ is changed once again. If the resistance of the further burden R2 is in this case reduced, this results in a greater change in the permeability μ. The burden R2 which can be connected is now preferably chosen such that the change caused in this way to the measurable permeability μ corresponds to the situation when a fault current occurs, for example a tripping fault current, in response to which the circuit breaker 2 disconnects the conductors L1–L3, N. The connection of the burden R2 therefore simulates the occurrence of a fault current.

The major advantage of this test method is that the choice of a suitable resistance for the burden R2 makes it possible to simulate tripping fault currents of different magnitudes so that it is possible to check the sensitivity of the circuit breaker 2. Furthermore, the test circuit 16 does not require a separate voltage supply. This is because its principle of operation results in a voltage being induced via the test winding 18 in the test circuit 16.

A further advantage of the test circuit 16 is that it can at the same time be used for remote tripping. This can be done just by connecting appropriate remote tripping lines 24 to the test circuit 16. In particular, the floating configuration of the test circuit 16 is advantageous with regard to the safety requirements for such remote tripping. If the test circuit 16 is at the same time used for remote tripping, then it is necessary to ensure that the test winding 18 is sufficiently well isolated from the control winding 6, which is normally at the same potential as the main circuit.

If the permanent burden R1 is arranged in the test circuit 16 as shown in FIG. 1, the test winding 18 is preferably arranged symmetrically and uniformly around the core-balance current transformer 4. This results in the core-balance current transformer 4 being burdened independently of a field distribution, in order to avoid errors in the evaluation resulting from inhomogeneities in the magnetic fields. Such inhomogeneities are caused by an asymmetric arrangement of the conductors L1–L3, N in the core-balance current transformer 4 so that, even when no fault current is flowing, local magnetic fields occur which lead to local magnetization in the core-balance current transformer 4. The induction effects of these local magnetizations cancel one another out overall only when a winding is distributed homogeneously on the transformer core.

The advantageous arrangement of the permanent burden R1 in parallel with the test winding 18, instead of the arrangement in parallel with the control winding 6, will be explained with reference to FIG. 4 and FIG. 5.

Figure 4:
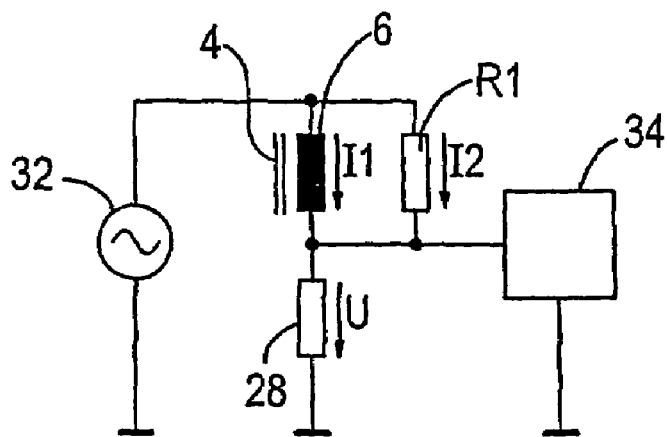
FIG. 4 shows a detail from the circuit arrangement of a circuit breaker with a burden arranged in parallel with the control winding of the circuit breaker.
Figure 5:
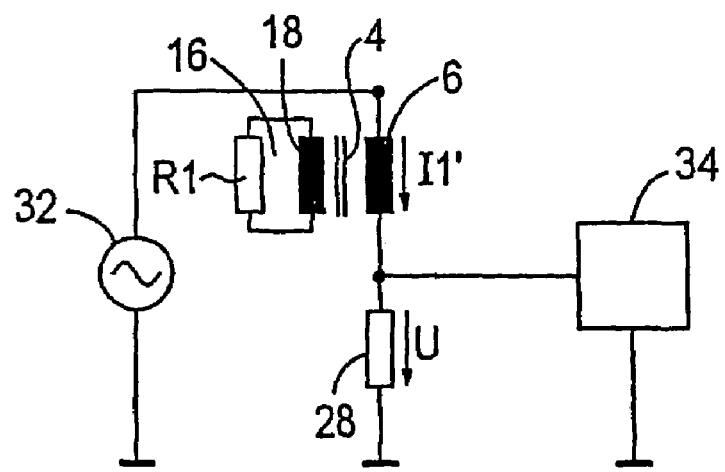
FIG. 5 shows a detail of a circuit arrangement of a test switch with a permanent burden arranged in parallel with the test winding.

FIG. 4 in this case shows the conventional arrangement of the burden R1 in parallel with the control winding 6, and FIG. 5 shows the new arrangement of the permanent burden R1 within the test circuit 16. An AC voltage is applied to the control winding 6 via a voltage generator 32. The already mentioned measurement resistor 28, which is used to detect the voltage drop across the control winding 6 as a measure of the measurable permeability, is in each case arranged in series with the test winding 6. An evaluation circuit 34 is provided in parallel with the measurement resistor 28. In the arrangement shown in FIG. 4, a current element I1 flows via the control winding 6, and a current element I2 flows via the permanent burden R1. The voltage drop U across the measurement resistor 28 is governed by the two current elements I1, I2. In contrast to this, and according to the exemplary embodiment shown in FIG. 5, all the current I1' flows via the control winding 6. This simplifies the evaluation of the voltage drop U across the measurement resistor 28.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A fault-current circuit breaker, comprising:
    a core-balance current transformer;
    a control winding wound around the core-balance current transformer; and
    a main voltage independent test circuit, including
        a floating test winding wound around the core-balance current transformer,
        a burden connected in parallel to the floating test winding, and
        a further burden, adapted to be connectable and influence the permeability of the core-balance current transformer, measurable via the control winding.

2. The circuit breaker as claimed in claim 1, wherein the test circuit includes a device adapted to short circuit the test winding.

3. The circuit breaker as claimed in claim 1, wherein the test circuit does not include a separate voltage supply.

4. The circuit breaker as claimed in claim 1, wherein the further burden includes a resistor connected in series with a test switch.

5. The circuit breaker as claimed in claim 1, wherein the further burden is designed such that a tripping criterion, which is predetermined for the circuit breaker, is at least satisfied by a defined amount.

6. The circuit breaker as claimed in claim 1, wherein the further burden is variable.

7. The circuit breaker as claimed in claim 1, wherein the burden is continuously acting to influence the permeability of the core-balance current transformer, measurable via the control winding.

8. The circuit breaker as claimed in claim 7 wherein the continuously acting burden is variable.

9. The circuit breaker as claimed in claim 1, wherein the test winding is wound symmetrically around the core-balance current transformer.

10. The circuit breaker as claimed in claim 1, wherein the test circuit includes a switch, via which the test winding can be short-circuited, for remote tripping.

11. The circuit breaker as claimed in claim 1, wherein a further winding is provided around the core-balance current transformer, for remote tripping.

12. The fault-current circuit breaker of claim 1, wherein the fault-current circuit breaker is a differential current circuit breaker.

13. The fault-current circuit breaker of claim 2, wherein the device is at least one of a test switch and push button.

14. The circuit breaker as claimed in claim 2, wherein the test circuit includes a further burden, adapted to be connectable and influence the permeability of the core-balance current transformer, measurable via the control winding.

15. The circuit breaker as claimed in claim 14, wherein the further burden includes a resistor connected in series with the test switch.

16. The circuit breaker as claimed in claim 4, wherein the further burden is designed such that a tripping criterion, which is predetermined for the circuit breaker, is at least satisfied by a defined amount.

17. The circuit breaker as claimed in claim 14, wherein the further burden is designed such that a tripping criterion, which is predetermined for the circuit breaker, is at least satisfied by a defined amount.

18. The circuit breaker as claimed in claim 4, wherein the further burden is variable.

19. The circuit breaker as claimed in claim 5, wherein the further burden is variable.

20. A method for checking the reliability of a fault-current circuit breaker including a core-balance current transformer and a control winding wound around the core-balance current transformer, comprising:

simulating an occurrence of a fault current by a main voltage independent test circuit with a floating test winding wound around the core-balance current transformer, and a burden connected in parallel to the floating test winding; and short-circuiting the test winding via a connectable further burden, so that permeability of the core-balance current transformer, measurable via the control winding, assumes a defined value.

21. The method as claimed in claim 20, wherein the burden is variable.

22. The method as claimed in claim 20, wherein the circuit breaker is a differential-current circuit breaker.

23. The method as claimed in claim 20, wherein the further burden is variable.

* * * * *